(12) United States Patent
Puri

(10) Patent No.: US 9,626,524 B2
(45) Date of Patent: Apr. 18, 2017

(54) MANAGING NETWORK IDENTITIES

(71) Applicant: SAP SE, Walldorf (DE)

(72) Inventor: Sunil Puri, Burnaby (CA)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 14/461,017

(22) Filed: Aug. 15, 2014

(65) Prior Publication Data

US 2014/0359791 A1 Dec. 4, 2014

Related U.S. Application Data

(63) Continuation of application No. 13/463,772, filed on May 3, 2012, now Pat. No. 8,875,307.

(51) Int. Cl.
*G06F 21/62* (2013.01)
*H04L 29/06* (2006.01)
*H04L 12/44* (2006.01)

(52) U.S. Cl.
CPC ............. *G06F 21/62* (2013.01); *H04L 12/44* (2013.01); *H04L 63/0407* (2013.01); *H04L 63/10* (2013.01); *G06F 2221/2117* (2013.01); *G06F 2221/2145* (2013.01); *G06F 2221/2153* (2013.01)

(58) Field of Classification Search
CPC ......... Y10S 707/99943; Y10S 707/956; G06T 11/206; H04L 9/007; H04L 12/44; H04L 63/10; H04L 63/0407; G06F 2221/2117; G06F 2221/2145; G06F 2221/2153; G06F 21/62
USPC ................................ 715/853, 854; 726/28
See application file for complete search history.

(56) References Cited

U.S. PATENT DOCUMENTS

| | | | | |
|---|---|---|---|---|
| 6,377,287 B1 * | 4/2002 | Hao | ................... | G06F 17/30994 707/E17.142 |
| 7,693,948 B2 * | 4/2010 | Heix | .................... | G06Q 10/107 709/206 |
| 2007/0011054 A1 * | 1/2007 | Sattler | ................ | G06Q 30/0603 705/26.35 |
| 2007/0162435 A1 * | 7/2007 | Hadari | ................. | G06Q 10/087 |

(Continued)

OTHER PUBLICATIONS

Yamashita, M, et al, Computing on an anonymous network. In Proceedings of the seventh annual ACM Symposium on Principles of distributed computing (PODC '88). ACM, New York, NY, USA, 117-130. DOI=10.1145/62546.62568 http://doi.acm.org/10.1145/62546.62568, 14 pages.

(Continued)

*Primary Examiner* — Brian Shaw
(74) *Attorney, Agent, or Firm* — Fish & Richardson P.C.

(57) ABSTRACT

Techniques for managing network identities include generating, with a local computing system, a tree structure representing a network comprising a plurality of entities, the tree structure comprising a plurality of nodes, each node of the plurality of nodes representing an entity of the plurality of entities, at least one entity of the plurality of entities is represented by more than one node of the plurality of nodes; assigning a unique identifier to each node; identifying each node of the plurality of nodes as being a protected node or an unprotected node; and transmitting, to a remote computing system, the tree structure, the unique identifiers for the protected nodes, and identity information of the entities for the unprotected nodes.

18 Claims, 16 Drawing Sheets

(56) References Cited

U.S. PATENT DOCUMENTS

2009/0006946 A1* 1/2009 Hanson ................ G06F 17/24
715/255
2010/0287377 A1* 11/2010 Lim ................ G06F 21/6218
713/176
2011/0041073 A1* 2/2011 Hoff ................ G06F 17/3097
715/741

OTHER PUBLICATIONS

Tani, Seiichiro, 2011 "Compression of View on Anonymous Networks: Folded View" Parallel and Distributed Systems, IEEE Transactions on, vol. PP, No. 99, p. 1, ISSN: 1045-9219, DOI: 10.1109/TPDS.2011.142 16 pages.

Felt, Adrienne, et al, Privacy Protection for Social Networking APIs. University of Virginia, 2008. http://www.cs.virginia.edu/felt/privacy/privacybyproxy.html, 2 pages.

Backstrom, Lars et al, Wherefore art thou r3579x?: anonymized social networks, hidden patterns, and structural steganography. In Proceedings of the 16th international conference on World Wide Web (WWW '07). ACM, New York, NY, USA, 181-190. DOI=10.1145/1242572.1242598 http://doi.acm.org/10.1145/1242572.1242598, 10 pages.

Angluin, Dana, Local and Global Properties in Networks of Processors, Association for Computing Machinery -89791-017-6/80/0400/0082, 1980, 12 pages.

* cited by examiner

MANAGING NETWORK IDENTITIES

CROSS REFERENCE TO RELATED APPLICATION

This application is a continuation of, and claims priority under 35 U.S.C. §120 to, U.S. patent application Ser. No. 13/463,772, filed May 3, 2012, and entitled "Managing Network Identities," the entire contents of which are hereby incorporated by reference.

TECHNICAL BACKGROUND

This disclosure relates to managing network identities and, more particularly, protecting identities of entities in a network.

BACKGROUND

A network is made up of a set of entities, such as things, individuals, groups, or organizations, and links between the entities that represent relationships, connections, or interactions between the entities. A user may want to learn generic information about the network. The network, however, may include entities that have strong expectations of privacy, and the user may not have permission to view the identity of such entities. The privacy of these entities needs to be protected while preserving the properties of the network, such as the presence of the entities in the network and the links between the entities. The privacy of these entities is typically protected through anonymization techniques in which information that can be used to identify the entities, such as names, e-mail addresses, phone numbers, and the like, are concealed from the user. Some anonymization techniques, however, do not adequately protect the privacy of the entities in the network.

SUMMARY

This disclosure describes systems, methods, apparatus, and computer-readable media for managing network identities including, for example, the features of generating, with a local computing system, a tree structure representing a network comprising a plurality of entities, the tree structure comprising a plurality of nodes, each node of the plurality of nodes representing an entity of the plurality of entities, at least one entity of the plurality of entities is represented by more than one node of the plurality of nodes; assigning a unique identifier to each node; identifying each node of the plurality of nodes as being a protected node or an unprotected node; and transmitting, to a remote computing system, the tree structure, the unique identifiers for the protected nodes, and identity information of the entities for the unprotected nodes.

In a first aspect combinable with any of the general embodiments, assigning a unique identifier to each node includes generating a number by combining an identification number of the entity associated with the node and identification numbers of entities associated with nodes along a path from a root node of the tree structure to the node; and encrypting the combined number.

In a second aspect combinable with any of the general embodiments, assigning the unique identifier to each node includes assigning a unique number to each node based on a path from a root node of the tree structure to the node.

In a third aspect combinable with any of the general embodiments, assigning a unique identifier to each node includes assigning the unique number to each node based on an order that a user of the remote computing system expands the nodes of the tree structure.

A fourth aspect combinable with any of the general embodiments includes maintaining a mapping of each unique identifier to information about the entity associated with the node associated with the unique identifier.

In a fifth aspect combinable with any of the general embodiments, identifying each node of the plurality of nodes as being a protected node or an unprotected node includes determining that a user of the remote computing system has permission to view identity information of the entity associated with the node; and identifying the node as being an unprotected node.

In a sixth aspect combinable with any of the general embodiments, identifying each node of the plurality of nodes as being a protected node or an unprotected node includes determining that a user of the remote computing system does not have permission to view identity information of the entity associated with the node; and identifying the node as being a protected node.

In a seventh aspect combinable with any of the general embodiments, the at least one entity represented by more than one node of the plurality of nodes is associated with at least one protected node.

Particular embodiments of the subject matter described in this disclosure can be implemented so as to realize none, one, or more of the following advantages. The identity of entities can be protected while revealing generic information about a network, such as the presence of these entities in the network and generic information about these entities, to a user. When an entity is present multiple times in a network, e.g., has a direct and indirect connection to a user, or has multiple indirect connections to the user but no direct connection, and the presence of the entity is represented by multiple instances in a user interface, it will be difficult for a user to infer that each instance is representing the same entity.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

In a general embodiment of the present disclosure, a computing system manages identities of entities in a network. An entity includes, for example, a thing, a person, a group, an organization, or a company. A network includes, for example, a social network, a supplier network, a business-to-business network, a peer-to-peer network, a communication network, a computer network, or a collection of hardware components. A network may be represented by a graph structure. The graph structure can be cyclic or acyclic. The graph structure can include multiple occurrences of the same entity. A node in the graph structure represents an entity in the network. The computing system generates a tree structure from the network graph. In the tree structure, each instance of an entity is represented by a distinct node. As a result, an entity can be represented by multiple distinct nodes in the tree structure. This occurs when, for example, the entity has a direct and an indirect connection to a user, or has multiple indirect connections to the user but no direct connection. The computing system assigns a unique identifier to each distinct node in the tree structure that is opaque relative to the identity information of the entity associated with the node. An identifier is opaque when the identifier does not reveal or include any identity information of the entity. As a result, an entity that is represented by multiple distinct nodes in the tree structure is associated with multiple unique opaque identifiers. This makes it difficult for a user to infer that the multiple nodes represent the same entity when the identity of the entity associated with the nodes is concealed from the user. When a user requests information about the network, the computing system transmits the tree structure, the unique identifiers for nodes associated with entities in which identity information is to be concealed from the user, and identity information of entities in which the user has permission to view the identity information.

Figure 1:
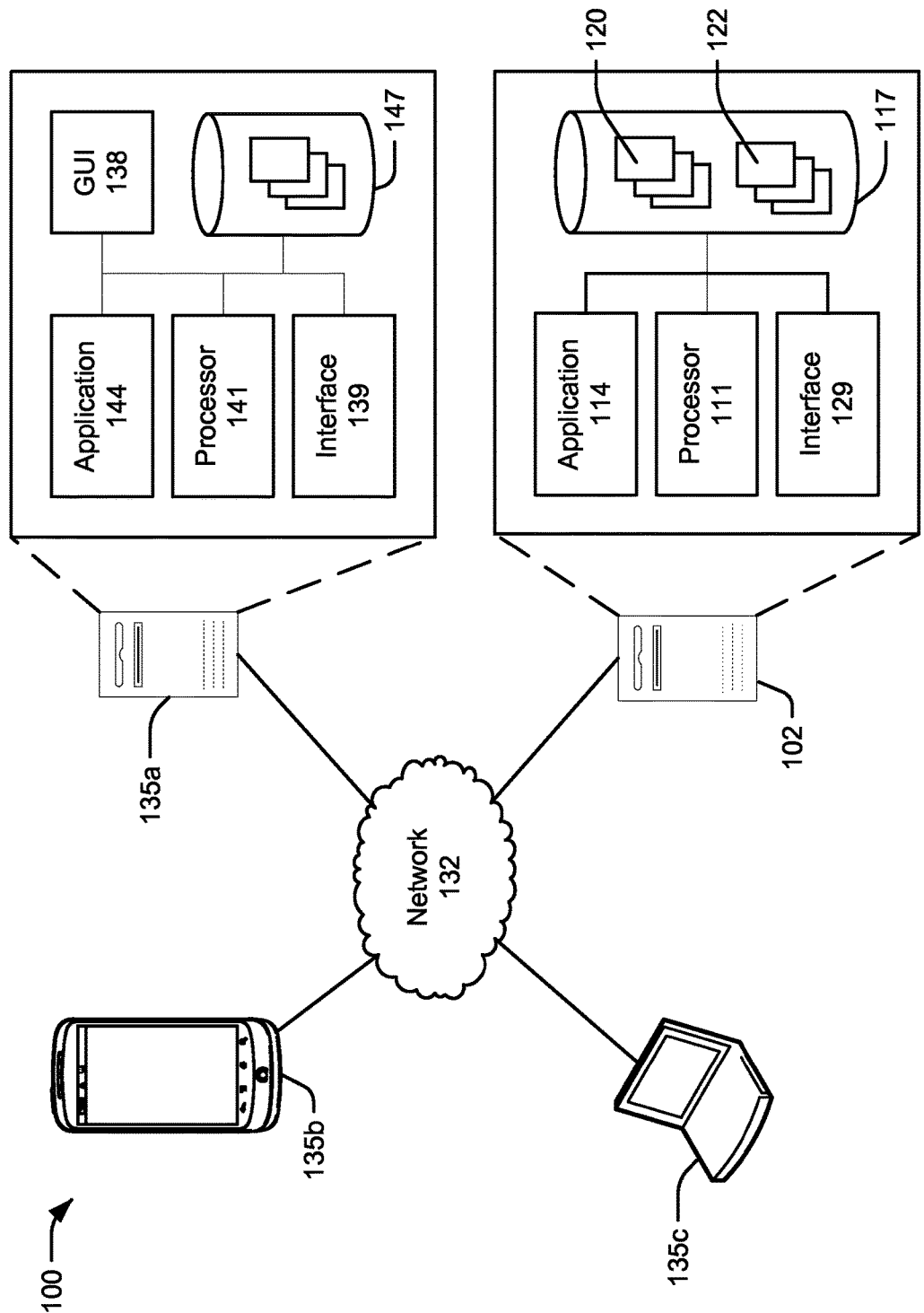
FIG. 1 illustrates an example distributed computing system operable to manage network identities.

FIG. 1 illustrates an example distributed computing environment 100 operable to manage network identities using a computing system 102. The illustrated environment 100 includes or is communicably coupled with the computing system 102 and one or more clients 135, at least some of which communicate across network 132. In general, environment 100 depicts an example configuration of a system capable of providing stateless and stateful execution of applications in a substantially transparent way, as well as dynamically determining the particular application's mode of operation in response to requests from its clients 135. For example, the system provides stateless execution when performing the operations associated with the techniques of assigning an identifier to a node in a network tree based on an entity's database record identification number, based on an entity's database record identification number and a user's identification number, or based on an entity's database record identification number and an identification number of an entity represented by a parent node, as described below and shown in FIGS. 6-8. An example of when the system provides stateful execution is when it performs the operations associated with the technique of sequentially assigning a unique identifier to a node in a network tree based on a path from a root node to the node, as described below and shown in FIG. 10.

In general, the computing system 102 may be a server that stores one or more hosted applications 114, where at least a portion of the hosted applications 114 are executed via requests and responses sent to users or clients within and communicably coupled to the illustrated environment 100 of FIG. 1. An example of a hosted application 114 is a network identity management application. An example of a network identity management application is a supplier identity management application for a supplier network. The supplier identity management application is executed by the computing system 102 to manage identities of suppliers in a supplier network.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing the requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, a virtual server, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis. For example, in some implementations, the enterprise-class solution implemented may address cleansing and standardization of records, such as, for example, database records 120.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store database records 120 that contain information associated with an entity. Memory 117 may also store tables 122 that include mappings of unique identifiers to database records 120 for each network displayed on a remote client. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
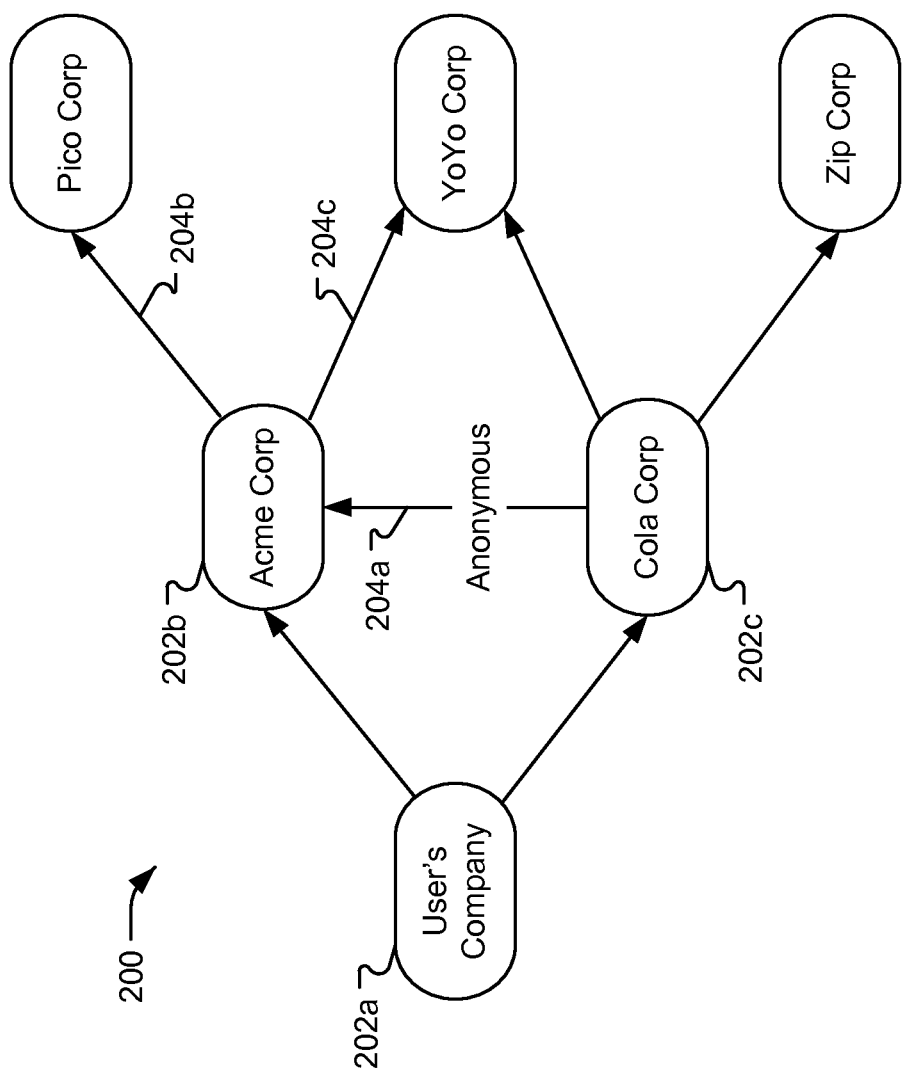
FIG. 2 illustrates an example network graph representing a network that includes entities.

FIG. 2 illustrates an example network graph 200 representing a network that includes entities. The network can be any type of network with any type of entities. The network graph 200 includes nodes 202 that each represents an entity in the network and links 204 that each represents a relationship, connection, or interaction between two entities. The links 204 may be directed links or undirected links.

For purposes of illustration, the network graph 200 will be described with respect to a network that includes suppliers. Each company in the network is represented by a node 202. A root node 202a of the network graph 200 represents a company of a user who is requesting information about the supplier network. Links 204 are directed links that connects two nodes. A link 204 points from a node for a company to a node for its supplier. For example, the link 204a points from node 202c for Cola Corp to node 202b for Acme Corp, which is a supplier for Cola Corp.

A user who is requesting information about a network can view the presence of all entities in the network. However, the user may not have permission to view identity information for all the entities in the network. In FIG. 2, for example, the link 204a is labeled "anonymous" to indicate that Cola Corp has not given the user permission to view the identity of its supplier Acme Corp. Because Cola Corp has not given the user permission to view its supplier Acme Corp connected through the link 204a, the user also does not have permission to view any suppliers beyond Cola Corp that are connected by a path that includes the link 204a, such as Pico Corp connected to Cola Corp through links 204a and 204b and YoYo Corp connected to Cola Corp through links 204a and 204c. Therefore, the identity of the companies connected to the user's company through the link 204a needs to be protected.

Figure 3:
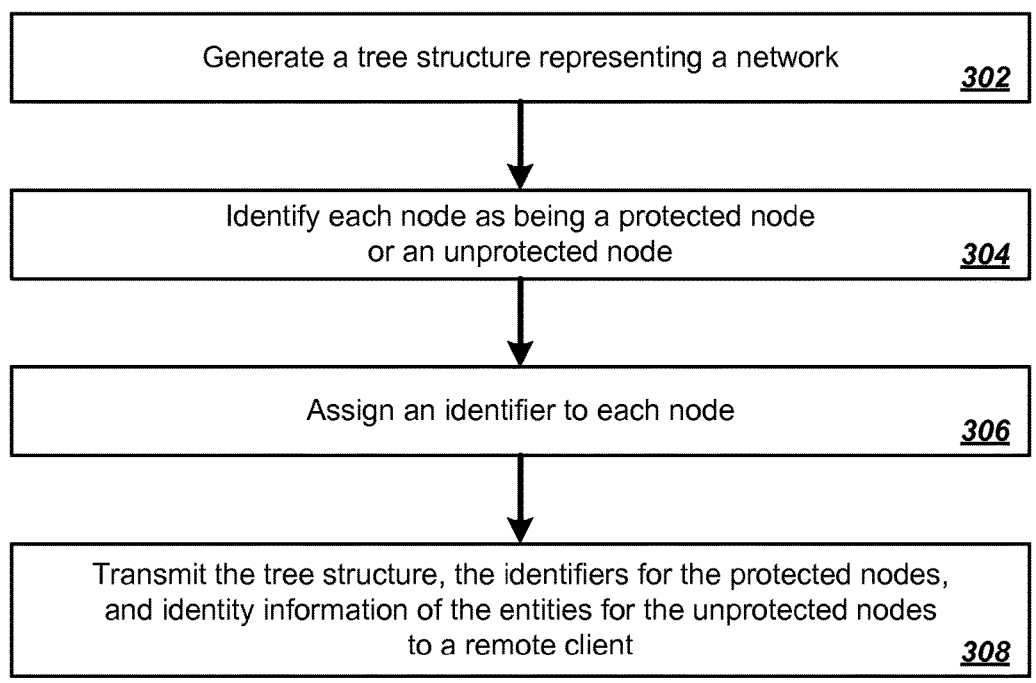
FIG. 3 illustrates an example flowchart for managing network identities.

FIG. 3 illustrates an example flowchart 300 for managing network identities. For purposes of illustration, the process 300 will be described with respect to a computing system, e.g., the computing system 102 of FIG. 1, that performs the process 300 and a remote client, e.g., clients 135 of FIG. 1.

Figure 4:
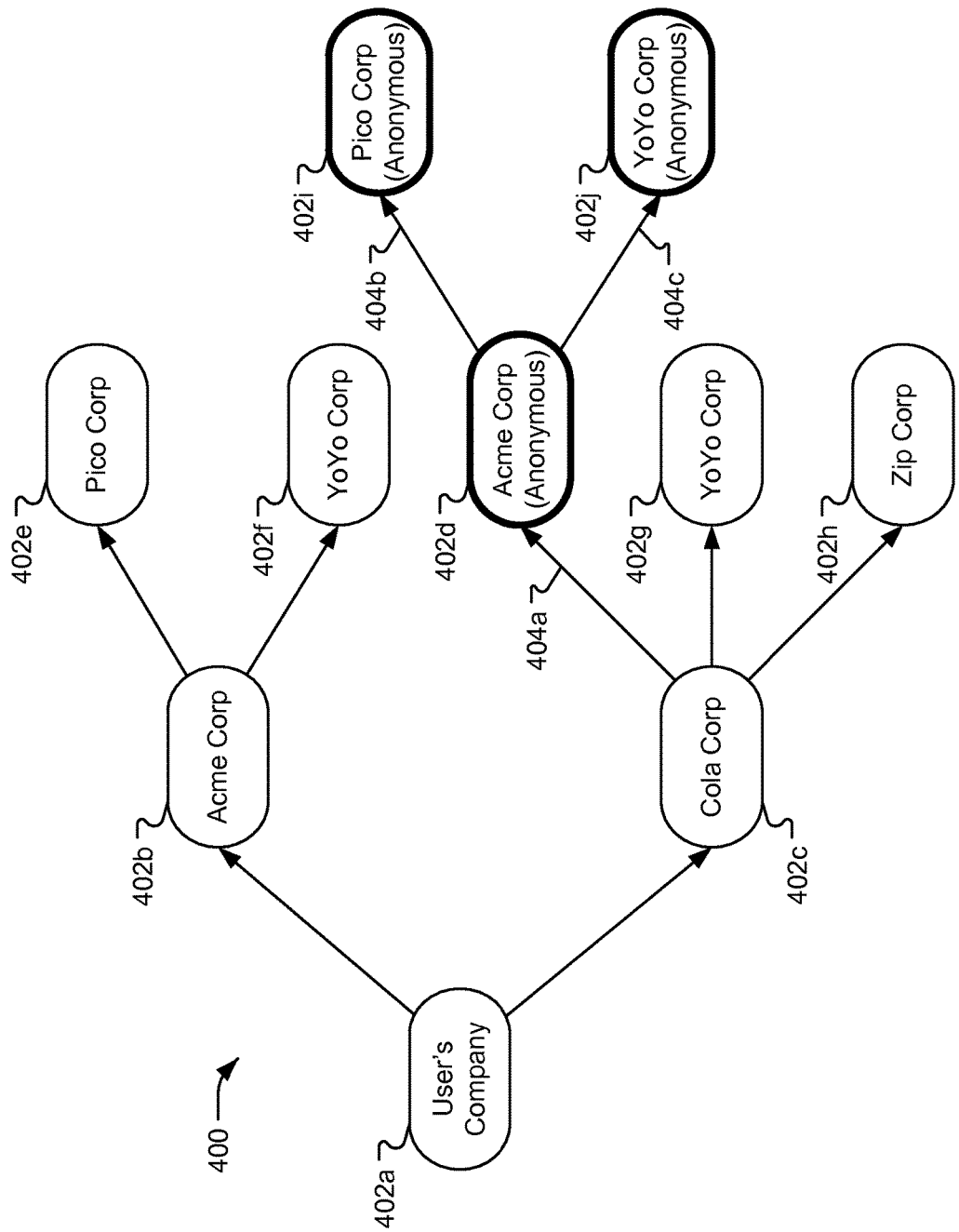
FIG. 4 illustrates an example network tree representing a network that includes entities.

In FIG. 3, the computing system generates a tree structure representing a network at step 302. The computing system may generate a tree structure from a network graph that represents the network. FIG. 4 illustrates an example network tree 400 representing the supplier network shown by the network graph 200 of FIG. 2. In FIG. 4, the supplier network is expanded as shown by the network tree 400 to eliminate any overlap of the companies and any cycles in the supplier network. Each company in the supplier network is represented by one or more nodes 402 in the network tree 400. A root node 402a of the network tree 400 represents a company of a user who is requesting information about the supplier network. Each link 404 connects a node for a company to a node for its supplier.

Referring again to FIG. 3, the computing system identifies each node as being a protected node or an unprotected node at step 304. A node is a protected node if the user does not have permission to view identity information of the company associated with the node. A node is an unprotected node if the user has permission to view identity information of the company associated with the node. A protected node is indicated in FIG. 4 by a highlighted node and a label "anonymous."

In the supplier network of FIG. 4, the user has permission to view the identity of its direct suppliers, such as Acme Corp represented by node 402b and Cola Corp represented by node 402c. The user can view the identity of its supplier's supplier if its supplier has granted the user permission to view the identity information for its supplier's supplier. For example, the user's supplier Acme Corp, represented by node 402b, has granted the user permission to view identity information for its suppliers Pico Corp, represented by node 402e, and YoYo Corp, represented by node 402f. The user's supplier Cola Corp, represented by node 402c, has granted the user permission to view identity information for its suppliers YoYo Corp, represented by node 402g, and Zip Corp, represented by node 402h. However, Cola Corp has not granted the user permission to view identity information for its supplier Acme Corp, represented by node 402d. Thus, the user also does not have permission to view identity information for Acme Corp's suppliers through node 402d, such as Pico Corp, represented by node 402i, and YoYo Corp, represented by node 402j.

As shown in FIG. 4, a company in the supplier network can be represented by more than one node in the network tree 400. This can occur when, for example, a company is a direct supplier and a third-party supplier, or when a company is a third-party supplier through multiple different direct suppliers. A company that is represented by more than one node in the network tree 400 can be represented by any combination of protected and unprotected nodes. For example, a company that is represented by two nodes in the network tree can be represented by a protected node and an unprotected node, two protected nodes, or two unprotected nodes. For example, in FIG. 4, Acme Corp is represented by node 402b, as the user's direct supplier, and 402d, as the user's third-party supplier. The user has permission to view the identity of its supplier Acme Corp represented by unprotected node 402b, but does not have permission from Cola Corp to view the identity of Cola Corp's supplier Acme Corp represented by protected node 402d. YoYo Corp is represented by three different nodes 402f, 402g, and 402j, of which nodes 402f and 402g are unprotected nodes and node 402j is a protected node. Pico Corp is represented by two different nodes 402e and 402i, of which node 402e is an unprotected node and 402i is a protected node.

Referring again to FIG. 3, the computing system assigns an identifier to each node in the tree structure at step 306. The identifiers are used by the computing system and a remote client to communicate and request information about the nodes in the network tree. Examples of techniques that can be used to assign identifiers to nodes in a tree structure are shown in FIGS. 6-10 and discussed below.

Figure 5:
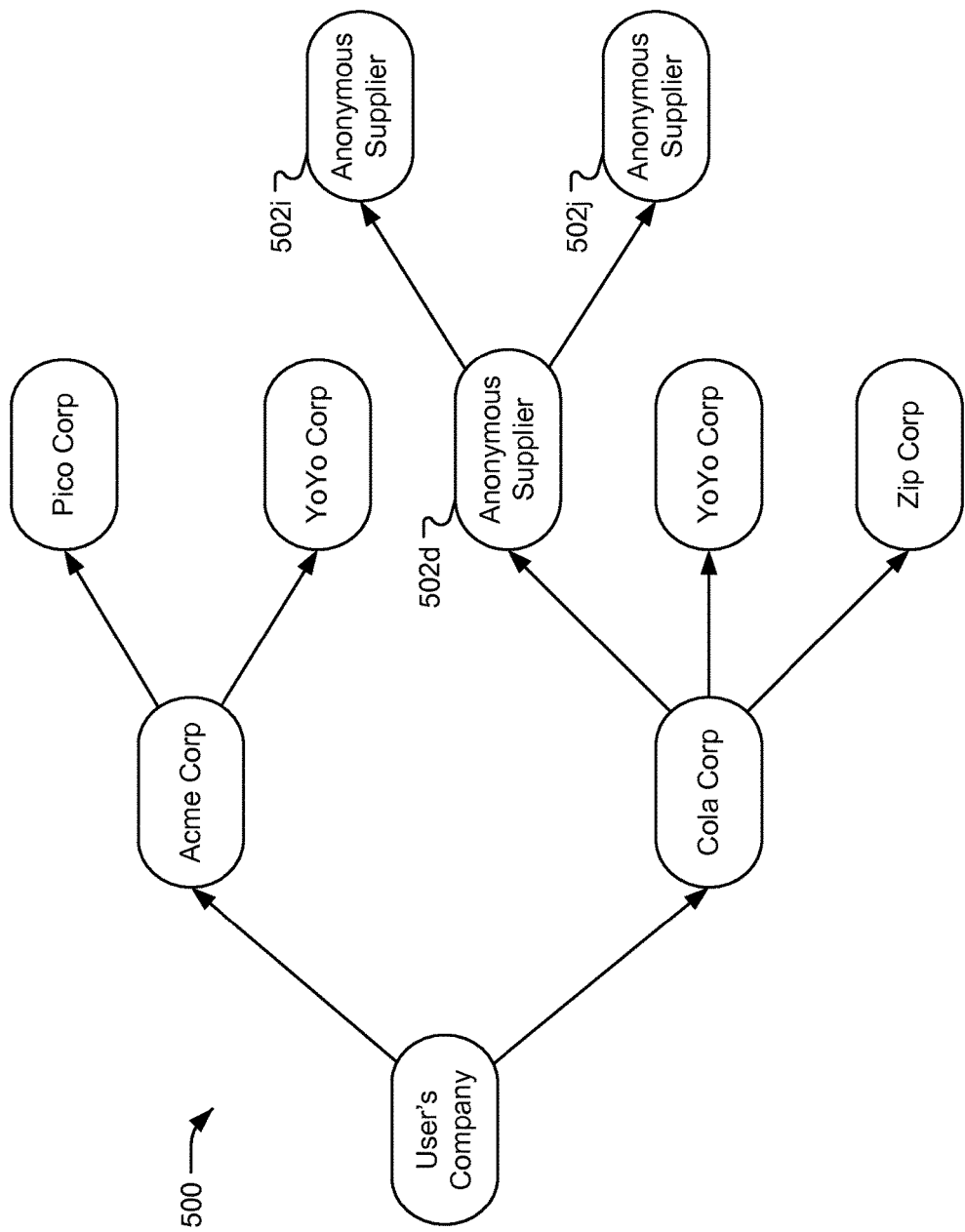
FIG. 5 illustrates an example network tree that is presented to a user by a remote client.

At step 308, the computing system transmits the tree structure, the identifiers for the protected nodes, and identity information of the entities for the unprotected nodes to a remote client. The remote client displays to a user a network tree representing the network. FIG. 5 illustrates an example network tree 500 that is presented to the user by a remote client. The network tree 500 displayed to the user corresponds to the network tree 400 of FIG. 4. In FIG. 5, identity information of the companies associated with protected nodes are concealed from the user, and identity information of the companies associated with unprotected nodes are shown to the user. For example, the identity information of the companies associated with protected nodes 502d, 502i, and 502j are not revealed to the user. Instead, the identity information for entities associated with protected nodes 502d, 502i, and 502j are replaced with a label, such as "Anonymous Supplier," to indicate the presence of a supplier without revealing the identity of the supplier to the user.

In addition to the identity information of the entities for the unprotected nodes, the computing system may transmit identifiers for the unprotected nodes. These identifiers may be used by the remote client to request further information associated with the nodes from the computing system. In this implementation, the computing system transmits the identifiers for all nodes of the network tree and identity information of the entities for the unprotected nodes to the remote client. The remote client uses the identifiers to request information associated with the nodes, such as non-identifying information of the entities associated with the protected nodes, of the network tree 500 from the computing system.

Figure 6:
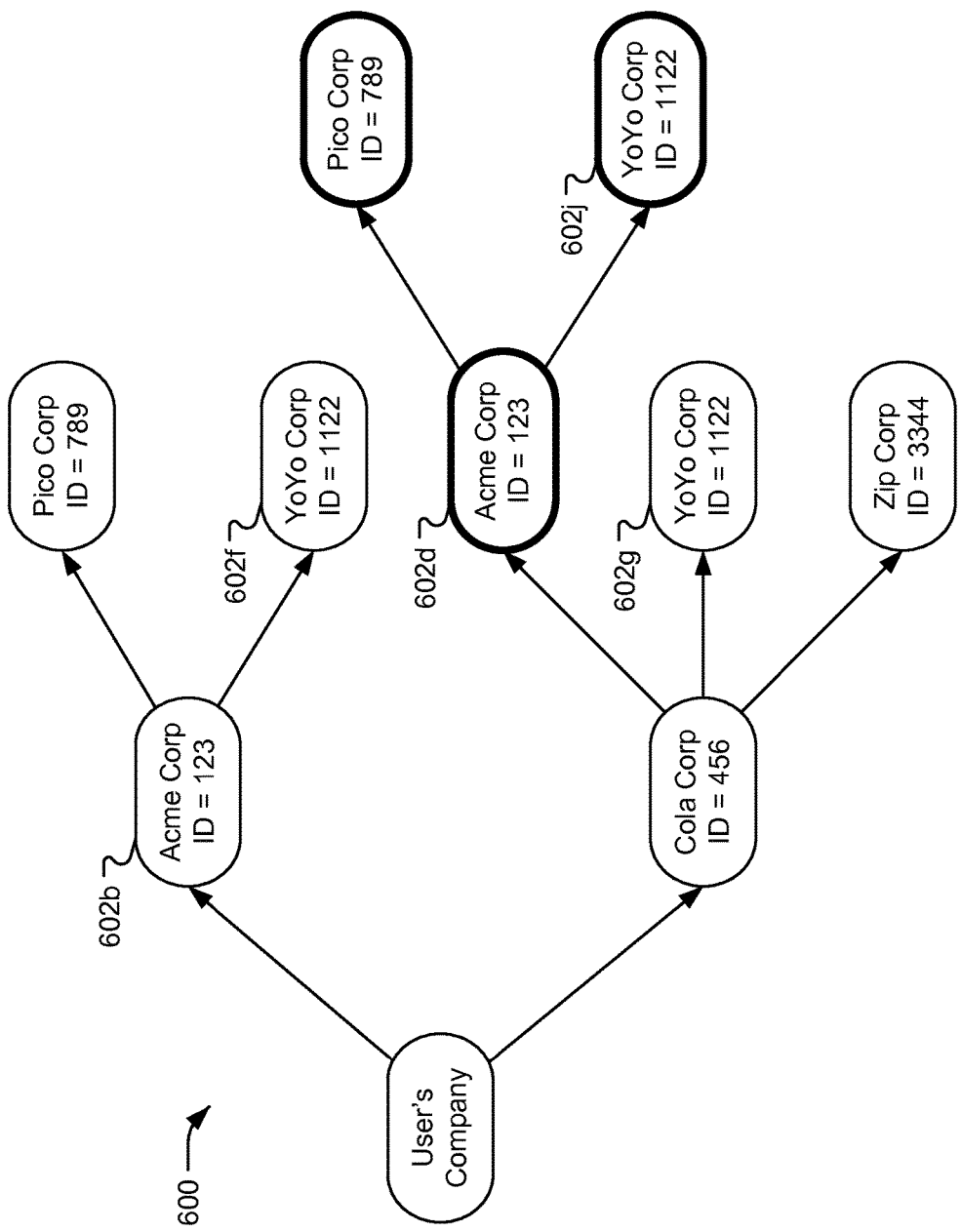
FIGS. 6-8 illustrate example techniques of assigning an identifier to a node in a network tree.

FIG. 6 illustrates an example technique of assigning an identifier to a node in a network tree 600 based on an entity's identification number, such as a database record identification number. In this case, the computing system assigns to a node the database record identification number of the entity that the node represents. For example, Acme Corp has a database record identification number of "123." The computing system assigns to nodes 602b and 602d, which represent Acme Corp, the identifier "123" corresponding to the database record identification number "123" associated with Acme Corp. As another example, YoYo Corp has a database record identification number of "1122." The computing system assigns to nodes 602f, 602g, and 602j, which represent YoYo Corp, the identifier "1122" corresponding to the database record identification number "1122" associated with YoYo Corp.

The computing system and a remote client use the identifier assigned to a node to communicate and request information associated with an entity represented by the node. For example, a remote client uses the identifier "123" to request information associated with the company Acme Corp represented by unprotected node 602b. The remote client uses the same identifier "123" to request information associated with the company Acme Corp represented by protected node 602d. Although the identity information of the company Acme Corp represented by protected node 602d is not displayed to the user of the remote system, the user can infer the identity information of the company represented by the protected node 602d by examining the identifiers that are communicated between the remote client and the computing system for all the nodes in the network tree. By examining the identifiers, the user can determine that the same identifier is used by the remote client and the computing system when communicating information associated with unprotected node 602b and protected node 602d. From this, the user can infer that protected node 602d represents the same company as unprotected node 602b. Therefore, assigning an identifier to a node in a network tree based on an entity's database record identification number may not adequately protect the identity of the entity associated with protected nodes.

Figure 7:
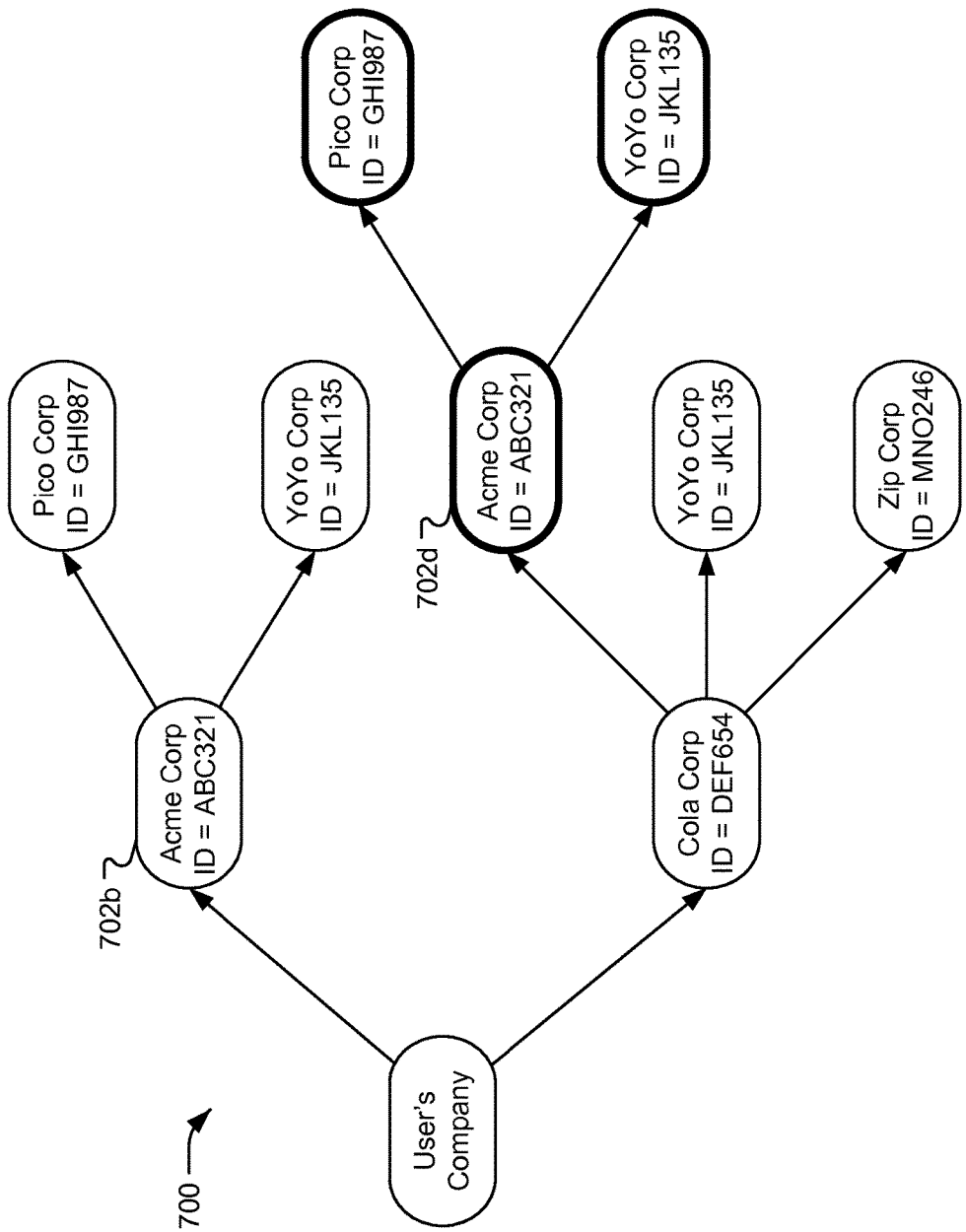

FIG. 7 illustrates an example technique of assigning an identifier to a node in a network tree 700 based on an entity's identification number, such as a database record identification number, and a user's identification number. In this implementation, the computing system assigns an identifier to a node by combining an entity's database record identification number with a user's identification number and encrypting the combined number.

For example, the computing system assigns to unprotected node 702b and protected node 702d, which both represent Acme Corp, the identifier "ABC321," which is an encrypted combination of the database record identification number associated with Acme Corp and the user's identification number. Although the identifiers assigned to the nodes will differ between users of the system, the identifiers for nodes that represent the same company will be identical for a given user. The user can determine that the same identifier is used by the remote client and the computing system when communicating information associated with unprotected node 702b and protected node 702d. From this, the user can infer that protected node 702d represents the same company as unprotected node 702b, even though the actual database record identification number was not transmitted to the remote client. Therefore, assigning an identifier to a node in a network tree based on a combination of an entity's database record identification number and user's identification number may not adequately protect the identity of the entity associated with protected nodes.

Figure 8:
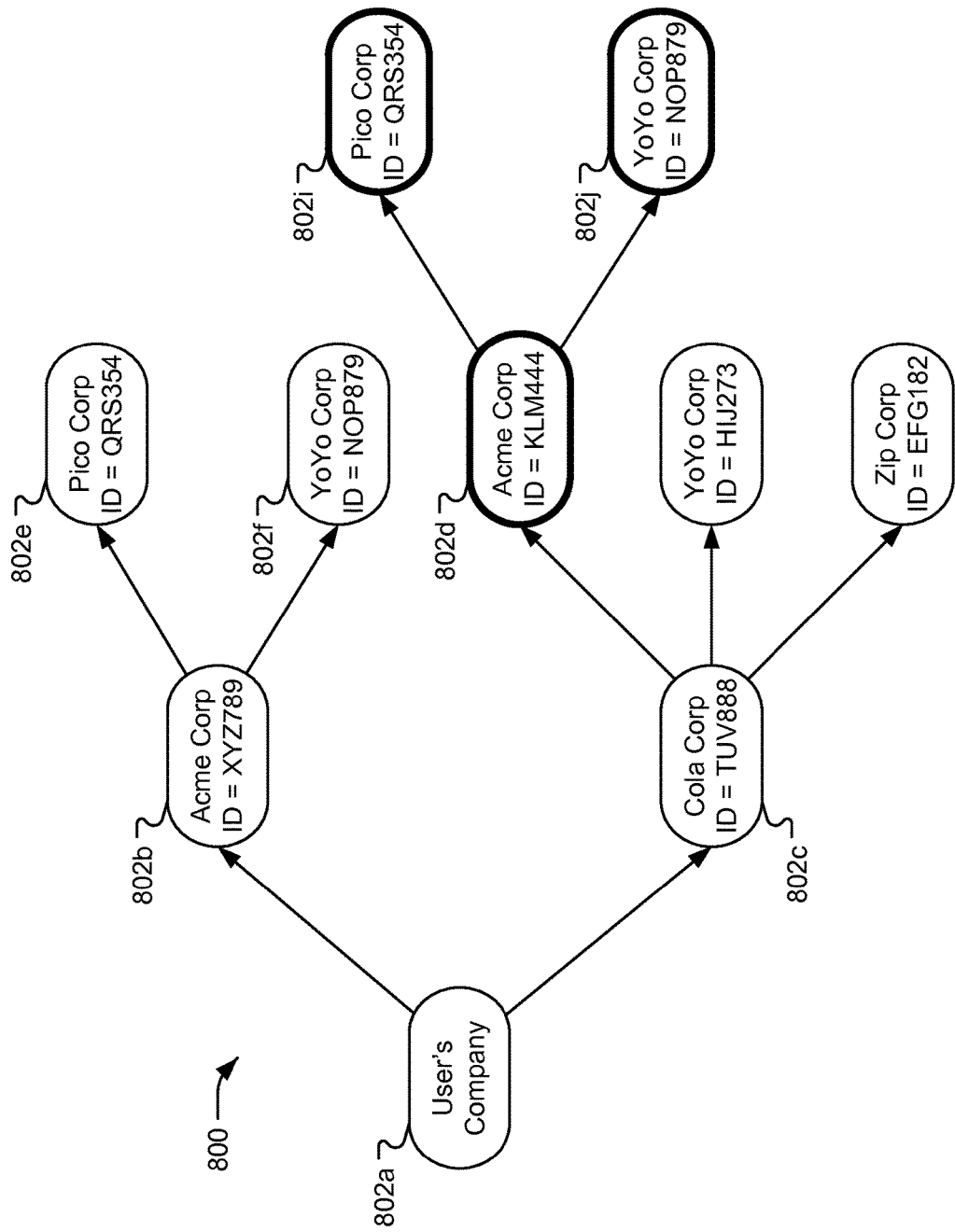

FIG. 8 illustrates an example technique of assigning an identifier to a node in a network tree 800 based on an entity's identification number, such as a database record identification number, and an identification number of an entity represented by a parent node. In this implementation, the computing system assigns an identifier to a node by combining an entity's database record identification number with an identification number of an entity represented by a parent node and encrypting the combined number.

For example, the computing system assigns to unprotected node 802b, representing Acme Corp, the identifier "XYZ789," which is the encrypted combination of the database record identification number associated with Acme Corp and the identification number of the entity associated with the parent node 802a, which is the user's identification number. The computing system assigns to protected node 802d, also representing Acme Corp, the identifier "KLM444," which is the encrypted combination of the database record identification number associated with Acme Corp and the identification number of the entity associated with the parent node 802c, which is the identification number of Cola Corp. Even though unprotected node 802b and protected node 802d represent the same company, the identifiers for unprotected node 802b and protected node 802d are no longer identical.

However, the identifiers for nodes 802e and 802i, representing Pico Corp, will be identical because the parent nodes 802b and 802d of nodes 802e and 802i represent the same company Acme Corp. Additionally, the identifiers for nodes 802f and 802j, representing YoYo Corp, will be identical because the parent nodes 802b and 802d of nodes 802f and 802j also represent Acme Corp. The user can determine that the same identifier is used by the remote client and the computing system when communicating information associated with unprotected node 802e and protected node 802i. From this, the user can infer that protected node 802i represents the same company Pico Corp as unprotected node 802e. Additionally, the user can determine that the same identifier is used by the remote client and the computing system when communicating information associated with unprotected node 802f and protected node 802j. From this, the user can infer that protected node 802j represents the same company YoYo Corp as unprotected node 802f. Thus, unprotected node 802e represents the same company as protected node 802i, unprotected node 802f represents the same company as protected node 802j, and the parent node 802b of nodes 802e and 802f and the parent node 802d of nodes 802i and 802j are identical. From this, the user can infer that protected node 802d represents the same company Acme Corp as unprotected node 802b. Therefore, assigning an identifier to a node in a network tree based on a combination of an entity's database record identification number and an identification number of an entity represented by a parent node may not adequately protect the identity of the entity associated with protected nodes.

In some implementations, the computing system assigns an identifier to a node in a network tree based on an encrypted combination of an entity's identification number and identification numbers of entities associated with all parent nodes in the supplier network chain. For example, the computing system assigns an identifier to node 802i based on an encrypted combination of Pico Corp's database record identification number, the identification number of Acme Corp represented by parent node 802d of 802i, and the identification number of Cola Corp represented by the parent node 802c of node 802d. This implementation protects identities of entities associated with protected nodes, but only up to N levels of indirection. If N is ten and the network tree has eleven levels, a user can detect duplicate companies at the eleventh level of the network tree.

Figure 9:
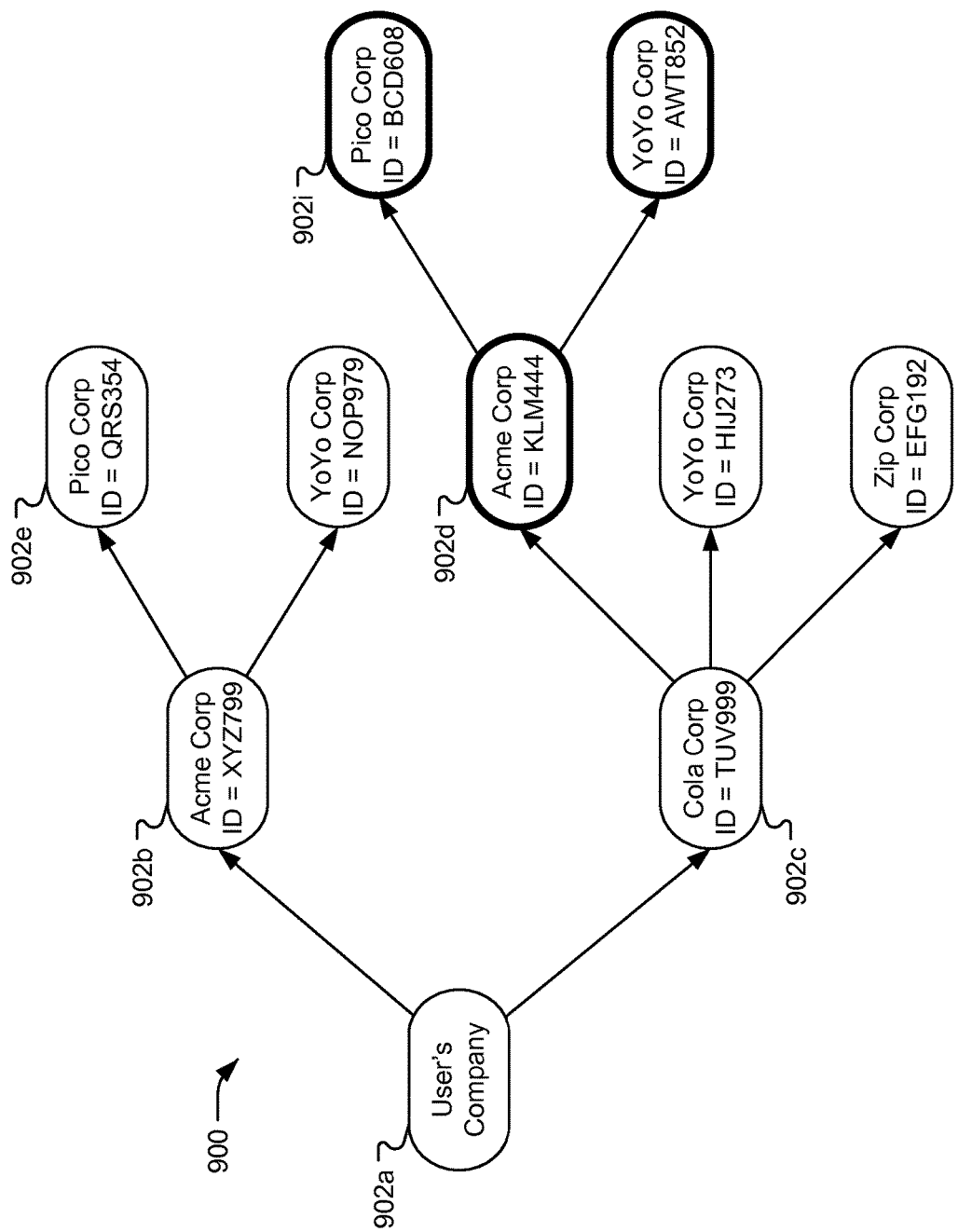
FIGS. 9 and 10 illustrate example techniques of assigning a unique identifier to each node in a network tree.

FIG. 9 illustrates an example technique of assigning an identifier to a node in a network tree 900 based on identification numbers of entities along the full path from a root node 902a to the node of which the identifier is to be assigned. The computing system may assign an identifier by encoding identification numbers of the entities along the full path. An identifier for a node may be generated by concatenating identification numbers of entities associated with each node along the path according to their position in the path between the root node and the node of which the identifier is to be assigned. By concatenating identification numbers of entities along the path according to their position, the computing system can correctly and unambiguously determine which entity is associated with which node and whether the node is a protected node or an unprotected node. The identification numbers of the entities may be separated by a delimiter or spaced in fixed width units. The concatenated identification numbers are then encrypted to obtain the identifier for the node. The generated identifier for each node is unique and has a one-to-one mapping with the full path from the root node to the node of which the identifier is assigned. This implementation protects identities of entities associated with protected nodes even when there are two or more paths in the network with the same entities but in different orders.

For example, the computing system assigns to unprotected node 902e, representing Pico Corp, the identifier "QRS354," which is the encrypted combination of the identification number of the entity associated with the root node 902a, which is the user's company's identification number, the identification number of the entity associated with node 902b, which is Acme Corp's identification number, and the identification number of the entity associated with node 902e, which is Pico Corp's identification number. The computing system assigns to protected node 902i, also representing Pico Corp, the identifier "BCD608," which is the encrypted combination of the identification number of the entity associated with the root node 902a, which is the user's identification number, the identification number of the entity associated with node 902c, which is Cola Corp's identification number, the identification number of the entity associated with node 902d, which is Acme Corp's identification number, and the identification of the entity associated with node 902i, which is Pico Corp's identification number. Even though unprotected node 902e and protected node 902i represent the same company, the identifiers for unprotected node 902e and protected node 902i are no longer identical. As shown in FIG. 9, nodes that represent the same company will not be assigned identical identifiers, and thus each node in the network tree 900 is assigned a unique identifier.

The computing system encrypts the encoded identification numbers and transmits the identifier to a remote client. The remote client stores the identifier. When the computing system receives the identifier from a remote client, the computing system decrypts the identifier to identify the company of which the remote client is requesting information. Although encoding identification numbers of companies along the full path from the root node to the node in which the identifier is to be assigned may provide adequate protection of the identity of companies represented by protected nodes, the computing system may require a significant amount of processing time to encrypt, encode, decrypt, and decode an identifier each time a user submits a request for information. Additionally, an identifier string may become significantly long for nodes at higher levels of the network tree. However, if the computing system does not support stateful execution in which a table that includes a mapping of identifiers to company information can be saved, as described below, encoding identification numbers of companies along the full path may provide adequate protection of the identity of the companies.

Figure 10:
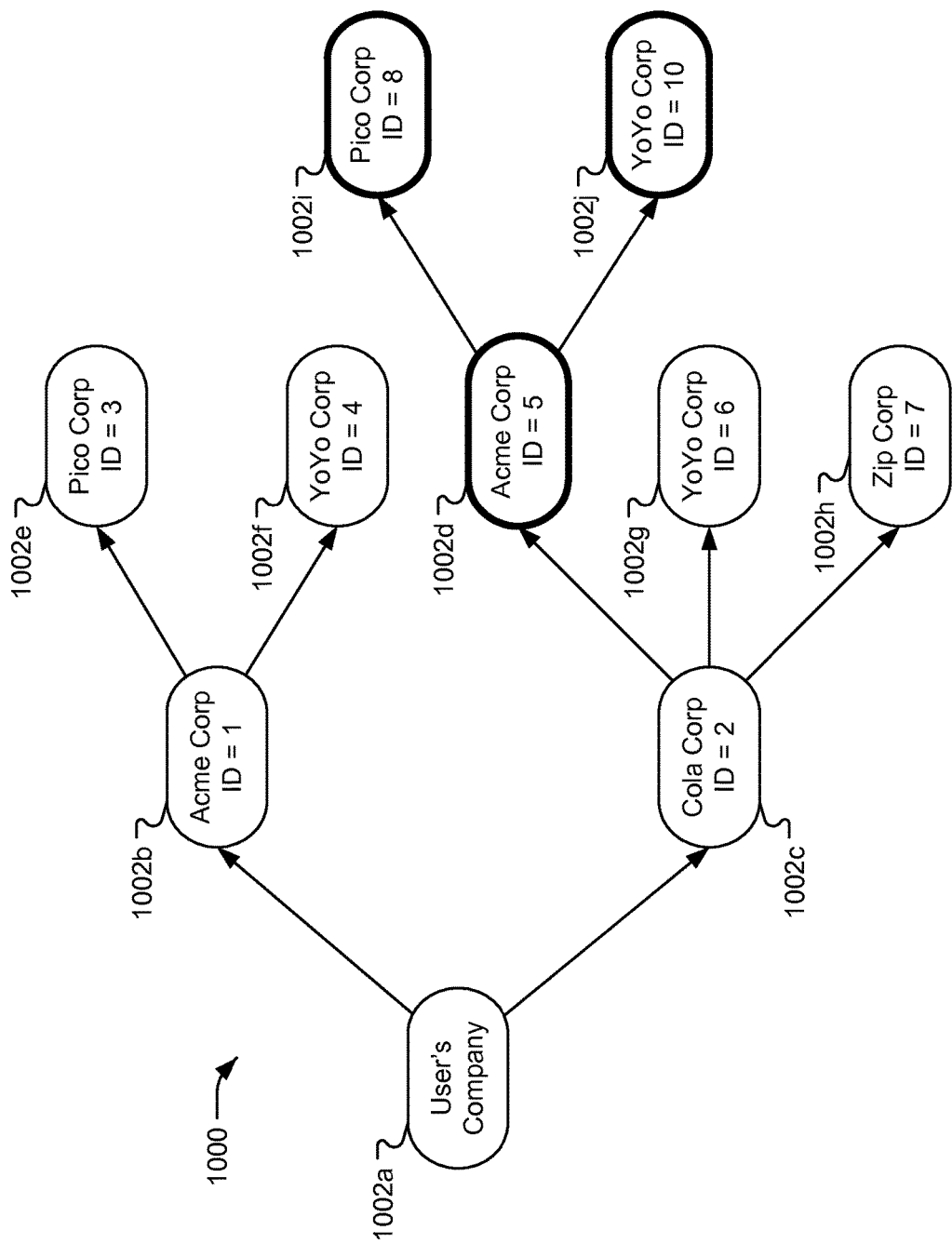

FIG. 10 illustrates an example technique of assigning a unique identifier to each node in a network tree 1000 based on a path from a root node 1002a to the node. The computing system may assign identifiers to the nodes by, for example, sequentially assigning a number or a letter to the nodes in the network tree 1000. In FIG. 10, for example, the computing system assigns identifiers to the nodes 1002b-1002j sequentially starting with the number "1." As shown in FIG. 10, nodes that represent the same company will not be assigned identical identifiers. A user thus will not be able to infer from the identifiers whether multiple nodes represent the same company. In alternative implementations, the computing system may assign unique identifiers that are generated randomly rather than sequentially.

Figure 11:
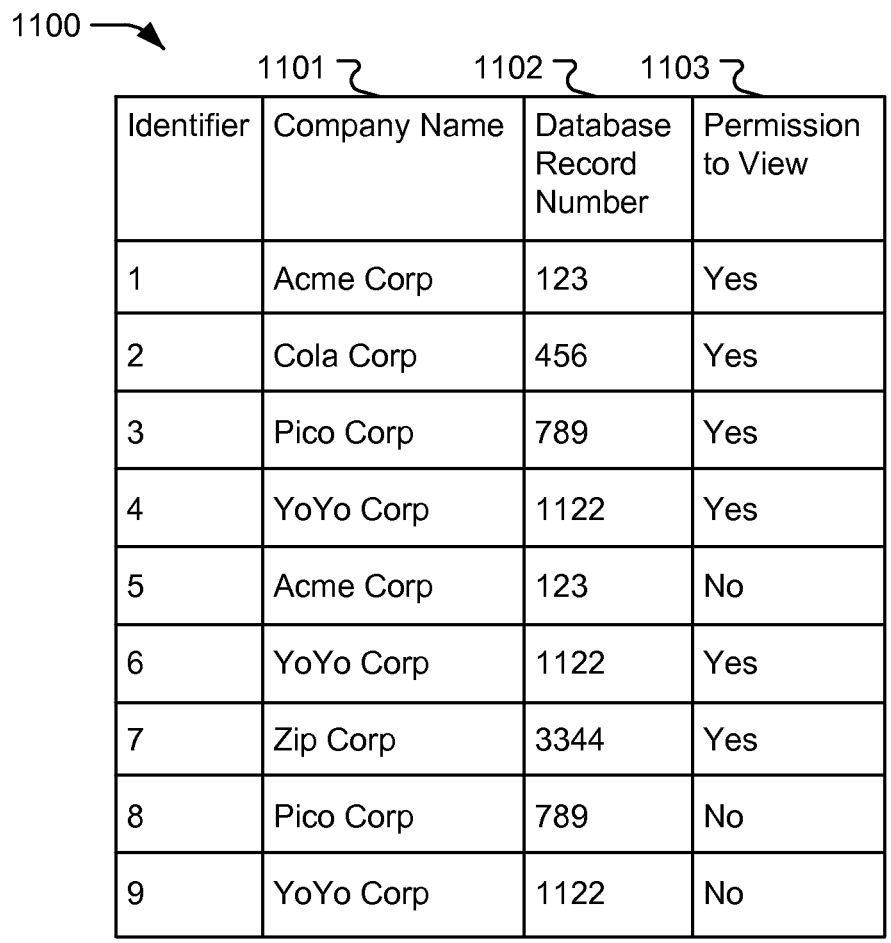
FIG. 11 illustrates an example table that includes a mapping of each identifier to information associated with an entity represented by a node associated with the identifier.

To manage the network identities using unique identifiers, the computing system maintains a table that includes a mapping of each identifier to information associated with the company represented by the node associated with the identifier. The table may be maintained in a memory of the computing system. FIG. 11 illustrates an example table 1100. The information associated with the company can include, for example, identity information of the company, such as company name 1101, the company's database record identification number 1102, and whether the user has permission to view the identity information of the company represented by the node 1103. When the computing system receives a request with an identifier from a remote client, the computing system accesses the table 1100 to identify the information associated with the company represented by the node associated with the identifier.

Figure 16:
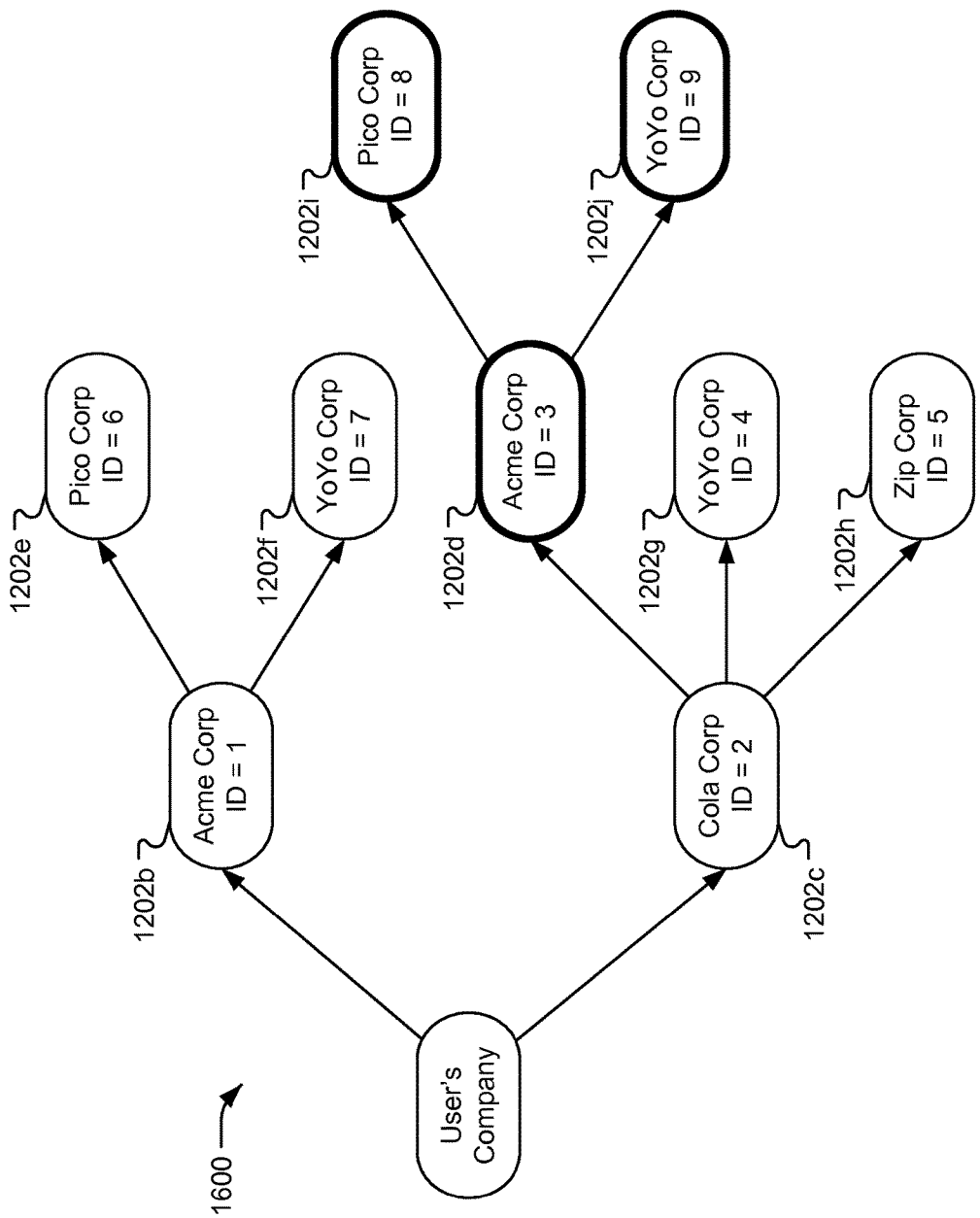
FIG. 16 illustrates an example network tree in which identifiers are assigned to nodes of the network tree.

In some implementations, the computing system transmits a portion of a network tree to a remote client for display to a user based on requests received from the remote client. For example, the computing system transmits portions of a network tree to a remote client based on a user expanding the nodes of the network tree. FIGS. 12-15 illustrate transmitting portions of a network tree 1200-1500 to a remote client for display to a user based a user expanding the nodes of the network tree. The computing system may assign identifiers to nodes based on an order that the user expands the nodes of the network tree. FIG. 16 illustrates an example network tree 1600 in which identifiers are assigned to nodes of the network tree 1600 based on an order that a user of a remote client expands the nodes of the tree structure, e.g., the order that the user expanded the nodes of the tree structure as shown in FIGS. 12-15. In FIG. 16, the identifiers that are assigned to the nodes may be different than the identifiers assigned to the nodes of FIG. 10, without compromising the privacy protection of the entities associated with the nodes.

Figure 12:
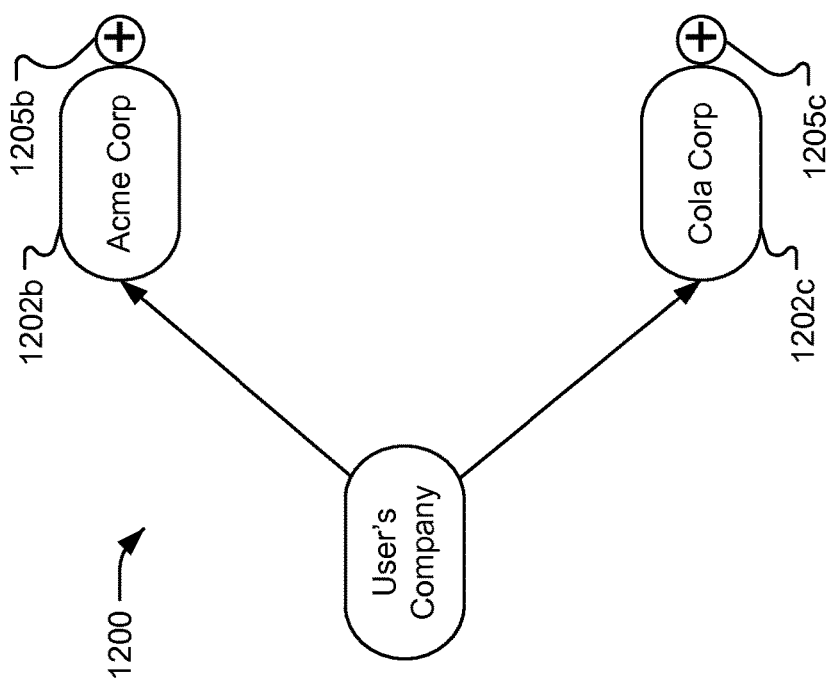
FIGS. 12-15 illustrate example portions of a network tree that is transmitted from a computing system to a remote client for display to a user.

In FIG. 12, the remote client requests to view information associated with the user's direct suppliers. The computing system assigns identifiers to the nodes representing the user's direct suppliers in sequential order. For example, the computing system assigns the node 1202b representing Acme Corp the identifier "1" and the node 1202c representing Cola Corp the identifier "2," as shown in FIG. 16. Referring again to FIG. 12, the computing system transmits the network tree 1200 and information associated with nodes 1202b and 1202c to the remote client for display to the user. The nodes 1202b and 1202c can be expanded to show the suppliers of the companies represented by nodes 1202b and 1202c, as indicated by "+" symbols 1205 next to the nodes.

The user expands node 1202c by selecting the "+" symbol 1205c. The remote client transmits a request to the computing system for supplier information associated with node 1202c. The computing system assigns identifiers "3," "4," and "5" to the nodes 1202d, 1202g, and 1202h, respectively, corresponding to the request for supplier information associated with node 1202c, as shown in FIG. 16. The computing system transmits supplier information associated with node 1202c to the remote client for display to the user, as shown by network tree 1300 of FIG. 13.

Figure 13:
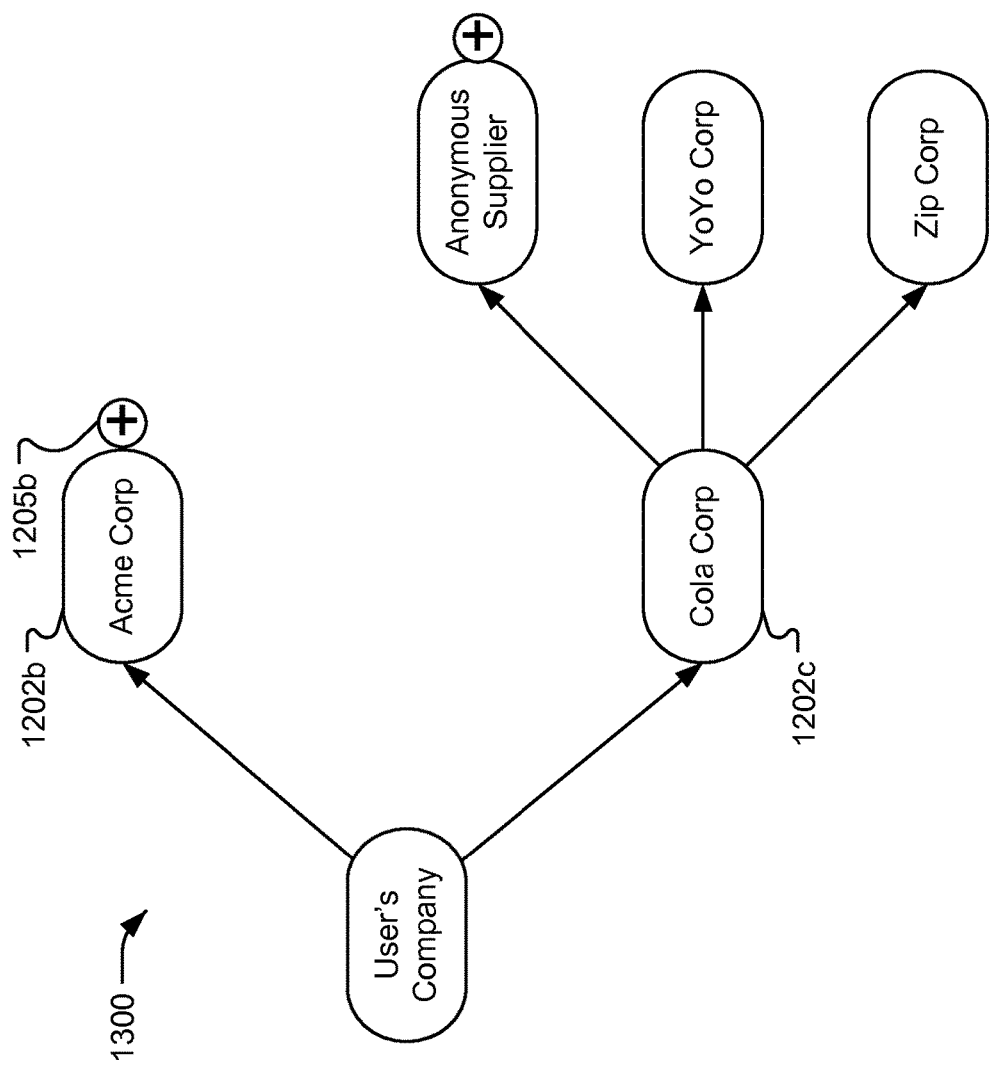

Referring to FIG. 13, the remote client then receives an input from the user selecting the "+" symbol 1205b to expand the node 1202b. The computing system receives the request to expand the node 1202b from the remote client. In response, the computing system assigns identifiers "6" and "7" to nodes 1202e and 1202f, respectively, corresponding to the request for supplier information associated with node 1202b. The computing system then transmits supplier information associated with node 1202b to the remote client for display to the user, as shown by network tree 1400 of FIG. 14.

Figure 14:
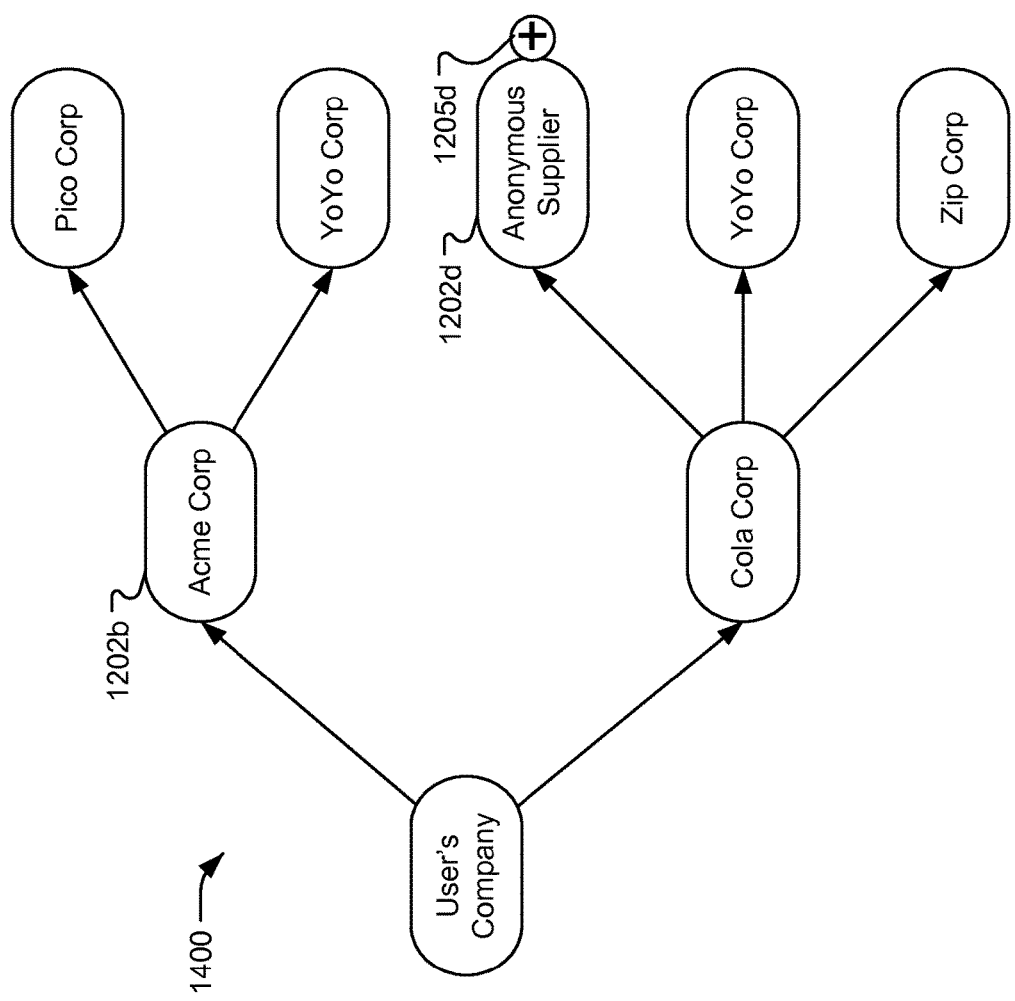
Figure 15:
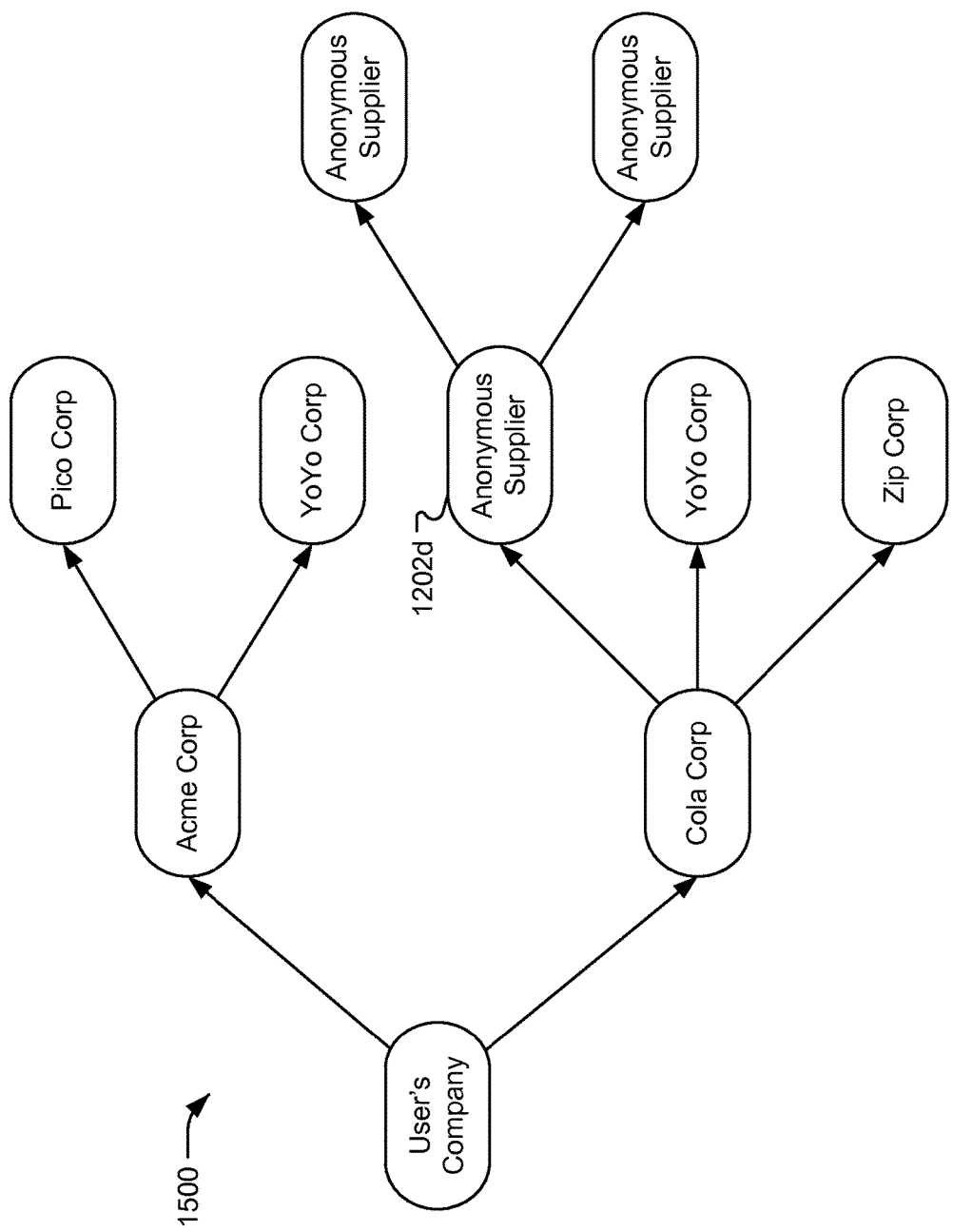

Referring to FIG. 14, the remote client then receives an input from the user selecting the "+" symbol 1205d to expand node 1202d. The computing system receives the request to expand the node 1202d from the remote client. In response, the computing system assigns identifiers "8" and "9" to nodes 1202i and 1202j, respectively, corresponding to the request for supplier information associated with node 1202d. The computing system then transmits supplier information associated with node 1202d to the remote client for display to the user, as shown by network tree 1500 of FIG. 15.

A number of implementations have been described. Nevertheless, it will be understood that various modifications may be made. For example, other methods described herein besides or in addition to that illustrated in FIG. 3 may be performed. Further, the illustrated steps of process 300 may be performed in different orders, either concurrently or serially. For example, steps 302, 304, and 306 may be performed in different orders, e.g., step 306 of assigning an identifier to each node may be performed before or after step 304 of identifying each node as being a protected node or an unprotected node. Further, steps may be performed in addition to those illustrated in process 300 and some steps illustrated in process 300 may be omitted without deviating from the present disclosure. Accordingly, other implementations are within the scope of the following claims.

What is claimed is:

1. A method for managing network identities, the method comprising:
   generating, with a local computing system, a tree structure representing a network comprising a plurality of entities, the tree structure comprising a plurality of nodes, each node of the plurality of nodes representing an entity of the plurality of entities;
   identifying a first node and a second node of the tree structure each associated with a respective identification number;
   identifying a first order of expansion of the tree structure, including:
      i) expanding the tree structure at a first node to include a first expanded branch at the first node, the first expanded branch including a third node,
      ii) assigning a first identification number to the third node based on the first order of expansion;
   identifying a second order of expansion of the tree structure, including:
      i) expanding the tree structure at the second node to include a second expanded branch at the second node, the second expanded branch including a fourth node,
      ii) subsequent to expanding the tree structure at the second node, expanding the tree structure at the first node to include the first expanded branch at the first node, the first expanded branch including the third node;
      iii) assigning a second identification number to the third node based on the second order of expansion, the second identification number different than the first identification number;
   assigning a unique identifier to each of a fifth and a sixth node, the fifth and the sixth node representing the same entity, the fifth node distinct from the sixth node, the assigning including:
      encoding a first unique identifier for the fifth node by combining i) an identification number of the entity that is represented by the fifth and the sixth nodes and ii) identification numbers of entities associated with other nodes along a first path from a root node of the tree structure to the first node, wherein the first unique identifier is based on an order of the other nodes along the first path, the first path including the first node and third node, the identification number of the third node based on one of the first and the second identification numbers,
      encoding a second unique identifier for the sixth node by combining i) the identification number of the entity that is represented by the fifth and the sixth nodes and ii) the identification numbers of entities associated with the other nodes along a second path from a root node of the tree structure to the second node, wherein the second unique identifier is based on an order of the other nodes along the second path, the order of the other nodes along the first path is distinct from the order of the other nodes along the second path, the second path including the second node and the fourth node;
   decoding the first unique identifier to determine that the fifth node is an unprotected node, the unprotected node including identifying information associated with the entity;
   decoding the second unique identifier to determine that the sixth node is a protected node, the protected node concealing the identifying information associated with the entity; and
   transmitting, to a remote computing system, the unique identifier for the sixth node, and the identifying information for the fifth node.

2. The method of claim 1, further comprising:
   encrypting the first unique identifier and the second unique identifier.

3. The method of claim 1, further comprising:
   maintaining a mapping of each unique identifier to information about the entity associated with the node associated with the unique identifier.

4. The method of claim 1, further comprising:
   determining that a user of the remote computing system has permission to view identity information of the entity associated with the fifth node; and
   identifying the fifth node as being an unprotected node.

5. The method of claim 1, further comprising:
   determining that a user of the remote computing system does not have permission to view identity information of the entity associated with the sixth node; and
   identifying the sixth node as being a protected node.

6. The method of claim 1, wherein the at least one entity represented by more than one node of the plurality of nodes is associated with at least one protected node.

7. A non-transitory computer storage medium encoded with a computer program, the program comprising instructions that when executed by one or more computers cause the one or more computers to perform operations comprising:

generating, with a local computing system, a tree structure representing a network comprising a plurality of entities, the tree structure comprising a plurality of nodes, each node of the plurality of nodes representing an entity of the plurality of entities;

identifying a first node and a second node of the tree structure each associated with a respective identification number;

identifying a first order of expansion of the tree structure, including:
i) expanding the tree structure at a first node to include a first expanded branch at the first node, the first expanded branch including a third node,
ii) assigning a first identification number to the third node based on the first order of expansion;

identifying a second order of expansion of the tree structure, including:
i) expanding the tree structure at the second node to include a second expanded branch at the second node, the second expanded branch including a fourth node,
ii) subsequent to expanding the tree structure at the second node, expanding the tree structure at the first node to include the first expanded branch at the first node, the first expanded branch including the third node;
iii) assigning a second identification number to the third node based on the second order of expansion, the second identification number different than the first identification number;

assigning a unique identifier to each of a fifth and a sixth node, the fifth and the sixth node representing the same entity, the fifth node distinct from the sixth node, the assigning including:
encoding a first unique identifier for the fifth node by combining i) an identification number of the entity that is represented by the fifth and the sixth nodes and ii) identification numbers of entities associated with other nodes along a first path from a root node of the tree structure to the first node, wherein the first unique identifier is based on an order of the other nodes along the first path, the first path including the first node and third node, the identification number of the third node based on one of the first and the second identification numbers,
encoding a second unique identifier for the sixth node by combining i) the identification number of the entity that is represented by the fifth and the sixth nodes and ii) the identification numbers of entities associated with the other nodes along a second path from a root node of the tree structure to the second node, wherein the second unique identifier is based on an order of the other nodes along the second path, the order of the other nodes along the first path is distinct from the order of the other nodes along the second path, the second path including the second node and the fourth node;
decoding the first unique identifier to determine that the fifth node is an unprotected node, the unprotected node including identifying information associated with the entity;

decoding the second unique identifier to determine that the sixth node is a protected node, the protected node concealing the identifying information associated with the entity; and transmitting, to a remote computing system, the unique identifier for the sixth node, and the identifying information for the fifth node.

8. The non-transitory computer storage medium of claim 7, further comprising:
generating a number by combining an identification number of the entity associated with the node and identification numbers of entities associated with nodes along a path from a root node of the tree structure to the node; and
encrypting the first unique identifier and the second unique identifier.

9. The non-transitory computer storage medium of claim 7, further comprising:
maintaining a mapping of each unique identifier to information about the entity associated with the node associated with the unique identifier.

10. The non-transitory computer storage medium of claim 7, further comprising:
determining that a user of the remote computing system has permission to view identity information of the entity associated with the fifth node; and
identifying the fifth node as being an unprotected node.

11. The non-transitory computer storage medium of claim 7, further comprising:
determining that a user of the remote computing system does not have permission to view identity information of the entity associated with the sixth node; and
identifying the sixth node as being a protected node.

12. The non-transitory computer storage medium of claim 7, wherein the at least one entity represented by more than one node of the plurality of nodes is associated with at least one protected node.

13. A system of one or more computers configured to perform operations comprising:
generating, with a local computing system, a tree structure representing a network comprising a plurality of entities, the tree structure comprising a plurality of nodes, each node of the plurality of nodes representing an entity of the plurality of entities;
identifying a first node and a second node of the tree structure each associated with a respective identification number;
identifying a first order of expansion of the tree structure, including:
i) expanding the tree structure at a first node to include a first expanded branch at the first node, the first expanded branch including a third node,
ii) assigning a first identification number to the third node based on the first order of expansion;
identifying a second order of expansion of the tree structure, including:
i) expanding the tree structure at the second node to include a second expanded branch at the second node, the second expanded branch including a fourth node,
ii) subsequent to expanding the tree structure at the second node, expanding the tree structure at the first node to include the first expanded branch at the first node, the first expanded branch including the third node;

iii) assigning a second identification number to the third node based on the second order of expansion, the second identification number different than the first identification number;

assigning a unique identifier to each of a fifth and a sixth node, the fifth and the sixth node representing the same entity, the fifth node distinct from the sixth node, the assigning including:

encoding a first unique identifier for the fifth node by combining i) an identification number of the entity that is represented by the fifth and the sixth nodes and ii) identification numbers of entities associated with other nodes along a first path from a root node of the tree structure to the first node, wherein the first unique identifier is based on an order of the other nodes along the first path, the first path including the first node and third node, the identification number of the third node based on one of the first and the second identification numbers, encoding a second unique identifier for the sixth node by combining i) the identification number of the entity that is represented by the fifth and the sixth nodes and ii) the identification numbers of entities associated with the other nodes along a second path from a root node of the tree structure to the second node, wherein the second unique identifier is based on an order of the other nodes along the second path, the order of the other nodes along the first path is distinct from the order of the other nodes along the second path, the second path including the second node and the fourth node;

decoding the first unique identifier to determine that the fifth node is an unprotected node, the unprotected node including identifying information associated with the entity;

decoding the second unique identifier to determine that the sixth node is a protected node, the protected node concealing the identifying information associated with the entity; and transmitting, to a remote computing system, the unique identifier for the sixth node, and the identifying information for the fifth node.

14. The system of claim 13, further comprising:
encrypting the first unique identifier and the second unique identifier.

15. The system of claim 13, further comprising:
maintaining a mapping of each unique identifier to information about the entity associated with the node associated with the unique identifier.

16. The system of claim 13, further comprising:
determining that a user of the remote computing system has permission to view identity information of the entity associated with the fifth node; and
identifying the fifth node as being an unprotected node.

17. The system of claim 13, further comprising:
determining that a user of the remote computing system does not have permission to view identity information of the entity associated with the sixth node; and
identifying the sixth node as being a protected node.

18. The system of claim 13, wherein the at least one entity represented by more than one node of the plurality of nodes is associated with at least one protected node.

* * * * *